US010261867B1

(12) United States Patent
Terry, II et al.

(10) Patent No.: US 10,261,867 B1
(45) Date of Patent: Apr. 16, 2019

(54) INTELLIGENT POINT-IN-TIME SELECTOR (71) Applicant: Veritas Technologies LLC, Mountain View, CA (US)

(72) Inventors: Victor Leon Terry, II, Winter Springs, FL (US); Gary Boix, Lake Mary, FL (US)

(73) Assignee: Veritas Technologies LLC, Santa Clara, CA (US)

( * ) Notice: Subject to any disclaimer, the term of this patent is extended or adjusted under 35 U.S.C. 154(b) by 296 days.

(21) Appl. No.: 15/005,774

(22) Filed: Jan. 25, 2016

(51) Int. Cl.
*G06F 17/30* (2006.01)
*G06F 11/14* (2006.01)
*G06F 3/0484* (2013.01)

(52) U.S. Cl.
CPC ...... *G06F 11/1469* (2013.01); *G06F 3/04842* (2013.01); *G06F 2201/80* (2013.01); *G06F 2201/84* (2013.01)

(58) Field of Classification Search
CPC ...................................................... G06F 17/30
USPC ......................................................... 707/679
See application file for complete search history.

(56) References Cited

U.S. PATENT DOCUMENTS

| 7,185,192 B1* | 2/2007 | Kahn | G06F 21/6218 707/999.003 |
|---|---|---|---|
| 7,318,134 B1* | 1/2008 | Oliveira | G06F 11/1471 711/161 |
| 7,322,010 B1 | 1/2008 | Mikula | |
| 7,788,521 B1* | 8/2010 | Sim-Tang | G06F 11/1471 714/20 |
| 8,285,835 B1 | 10/2012 | Deolasee et al. | |
| 8,327,028 B1* | 12/2012 | Shah | H04L 69/40 707/674 |
| 8,368,946 B2* | 2/2013 | Ohno | G06F 17/3028 348/207.2 |
| 9,734,021 B1* | 8/2017 | Sanocki | G06F 11/1469 |
| 2005/0262097 A1* | 11/2005 | Sim-Tang | G06F 17/30085 |
| 2007/0022319 A1* | 1/2007 | Haselton | G06F 11/1451 714/15 |

OTHER PUBLICATIONS

Porat et al., U.S. Appl. No. 10/737,008, entitled "Graphical display for application performance monitoring system", filed Dec. 16, 2003, 25 pages.

* cited by examiner

*Primary Examiner* — Kim T Nguyen
(74) *Attorney, Agent, or Firm* — Meyertons Hood Kivlin Kowert and Goetzel PC; Rory D. Rankin (57) ABSTRACT

A system and method for selecting point-in-time copies of data objects for restore operations. A user operates a mobile device with a touch screen, which is connected to a backup server through a network. The user selects a given data object from a graphical user interface (GUI) to restore from a backup server and selects a point-in-time for restoration. The mobile device searches point-in-time (PIT) indicator data corresponding to PIT backup copies of the given data object. If the mobile device determines there is no PIT indicator for the requested point-in-time, then the mobile device identifies one or more backups that include the given data object, automatically selects one of the one or more backups as a proposed backup for restoration, and automatically adjusts the input of the user on the graphical user interface to identify the selected one of the one or more backups.

20 Claims, 6 Drawing Sheets

INTELLIGENT POINT-IN-TIME SELECTOR

BACKGROUND OF THE INVENTION

Field of the Invention

This invention relates to the field of computing systems and, more particularly, to selecting point-in-time backup copies of data objects for restore operations.

Description of the Related Art

As computer memory storage and data bandwidth increase, so does the amount and complexity of data that business and industry manage each day. A large portion of the data that may be managed in an enterprise involves content managed for a company or workgroup by a dedicated server. Employees and customers have the ability to search and access corporate information, including electronic documents, announcements, task, discussion topics, emails, web pages and so forth. As this information may be considered crucial, it is backed up to backup storage to prevent loss or corruption of data. In particular, a database is often backed up as a single, monolithic database file, which contains all the tables, records, and indexing information for the database.

Multiple differential and/or incremental backup operations may be performed after a full backup operation for a database. These subsequent backup operations may be performed frequently and create a relatively large number of point-in-time backup copies of a given item. For example, should the backup operations be performed every second, a given item may have 86,400 point-in-time copies per day. Even with a rate of one backup operation per minute, the given item may have 1,440 point-in-time copies per day. When a user wants to restore one or more items, the relatively high number of point-in-time copies available for selection may be unmanageable for the user.

An interface for a backup and restore application may provide too much information that overburdens the user. For example, the interface may provide a log file of a relatively high number of point-in-time copies of a given item from which to perform a restore, which is difficult to manage. Alternatively, the interface may provide an indication that a selected point-in-time copy of the given item does not exist resulting in one or more trial-and-error attempts by the user. In order to find a point-in-time copy from which to perform a restore, the user may become frustrated. In addition, the user may select a less optimal point-in-time copy as too little information is provided regarding the available point-in-time copies.

In view of the above, improved systems and methods for selecting point-in-time backup copies of data objects for restore operations are desired.

SUMMARY OF THE INVENTION

Systems and methods for selecting point-in-time backup copies of data objects for restore operations are contemplated. In various embodiments, a backup server is connected to a storage medium that stores backup copies of multiple data objects. The multiple data objects correspond to electronic documents, script files, tasks, emails, web pages, design production files and so forth. In some embodiments, the multiple data objects are within a database file. Each backup copy of a data object corresponds to a point-in-time when the backup was performed. Metadata, such as an associated point-in-time indicator, may also be stored that indicates this point-in-time. The backup operation may be a full backup, an incremental or a differential operation. The point-in-time may include a month of the year, a day of the month, an hour of the day, a minute of the hour, and/or a second of the minute. Other examples of values indicating a point-in-time are possible and contemplated.

In various embodiments, a user may operate a mobile device with a touch screen. Such a device may be connected to the backup server through a network (e.g., the Internet). The mobile device may be a tablet computer, a smartphone, or other type of mobile device. In some embodiments, the mobile device may include a graphical user interface (GUI) for a backup and restore application. In various embodiments, the user provides input via a graphical user interface, where the input is configured to request restoration of a backup for a given data object. Additionally, the request identifies a desired point-in-time of the backup. In response to determining a backup of the given data object does not exist for the point-in-time, one or more backups that do include the given data object are identified, one of the one or more backups is automatically selected as a proposed backup for restoration, the user's input is automatically adjusted on the graphical user interface to identify the selected one of the one or more backups.

These and other embodiments will be appreciated upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Crucial information is typically backed up for protection against loss or corruption. The information may include electronic documents, script files, tasks, emails, web pages, design production files and so forth. The information may be backed up or archived in a given format according to a backup application used to archive the information. The backup information may consist of multiple tables and records. A given point-in-time copy of a given data object may include one or more records in one or more tables. The backup operation may be a full backup operation, an incremental backup operation or a differential operation. As thousands of backup operations for the given data object may occur per day, there may be thousands or tens of thousands of point-in-time copies of the given data object stored in the backup information.

Users creating, modifying and accessing the information may be system administrators, employees, application developers and so forth. The users may wish to restore one or more data objects from the backup information at a time after the one or more data objects were backed up. However, there may be thousands or tens of thousands of point-in-time copies of a given data object stored in the backup information for a particular day. Rather than provide too little or too much information regarding possible point-in-time copies from which to select, a backup application may include a graphical user interface (GUI) for a restore operation that provides to the user a manageable number of point-in-time copies. For example, the user may select a date from a calendar in the GUI. The GUI may also include sliders with handles that snap to a nearest time of day that has an associated record in the backup information, rather than the handles slide freely and present all possible continuous times. In some examples, a first slider corresponds to an hour of the day and a second slider corresponds to a minute of the day. Other examples of time values indicated by the sliders are possible. Additionally, the granularity of the time values may be configurable and selected by the user.

The handles of the sliders may be moved left or right to increase or decrease the hour or minute values. The user may use a touch screen to move the handles by moving the user's finger or moving a stylus pen over the touch screen. In addition, drop-down menus may be used to present a manageable number of available point-in-time copies of a requested data object. For example, after the user selects a date in the presented calendar and selects an hour of the day with an associated slider handle, the drop-down menu may present six available point-in-time copies of the requested data object, one at each ten-minute increment within the selected hour.

The GUI may include an hour and minute indicator presented as a digital clock. The indicator may provide the hour and minute of a selected record. The user may type an hour and minute pair directly into the indicator, but the indicator may snap to a different hour and minute corresponding to an available record when the input hour and minute from the user does not correspond to an available record. The available record is associated with an available point-in-time copy of a requested data object. An indication, such as a color change, a font type, a popup box or other may be used to alert the user that a different hour and minute are used rather than the input values. In this manner, the GUI allows the user to find an available point-in-time copy of the requested data object without burdening the user with an unmanageable number of possible point-in-time copies or providing a trial-and-error method for finding an available point-in-time copy.

Figure 1:
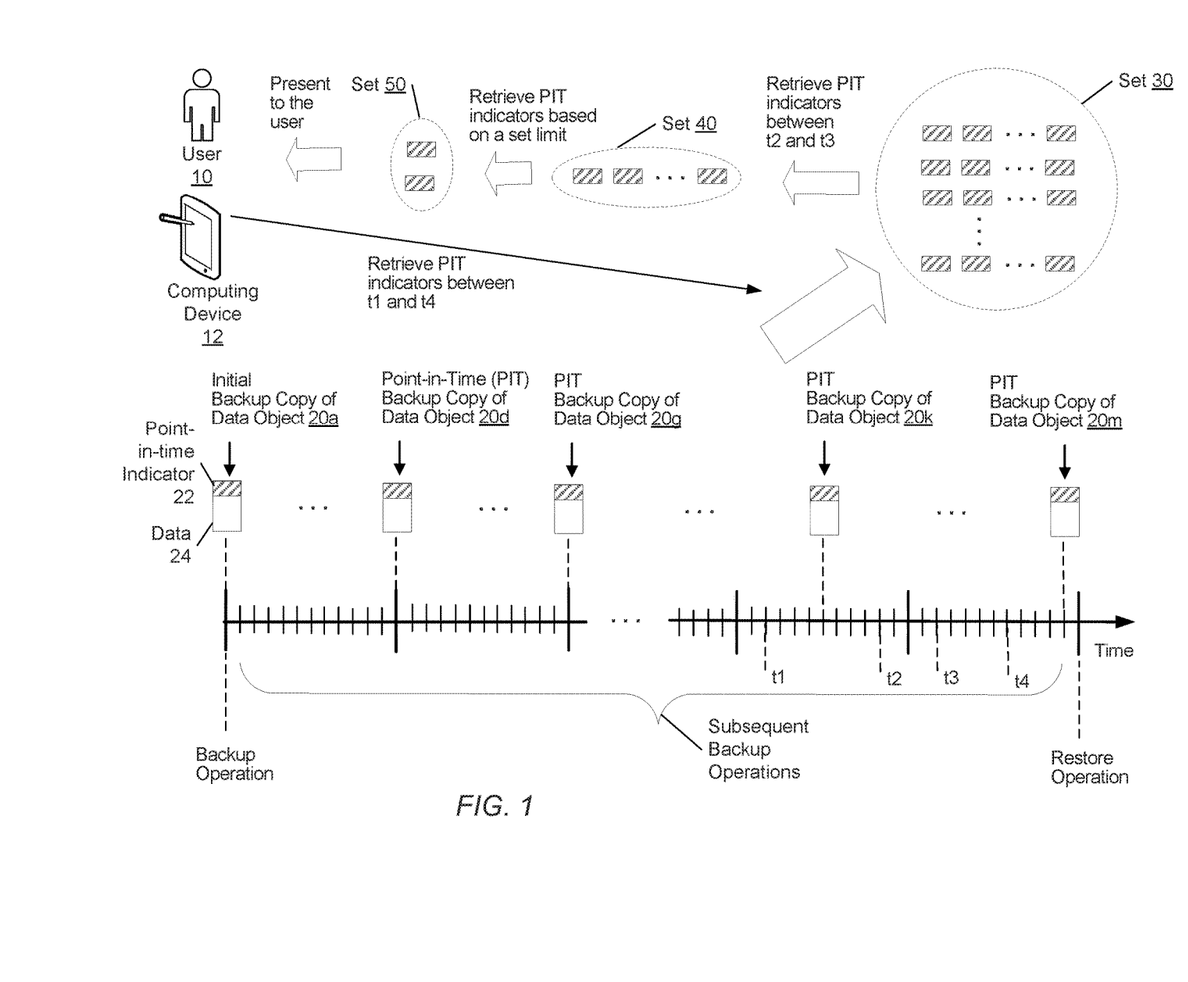
FIG. 1 is a generalized block diagram illustrating one embodiment of reducing a number of point-in-time indicators of data objects to present to a user.
Figure 2:
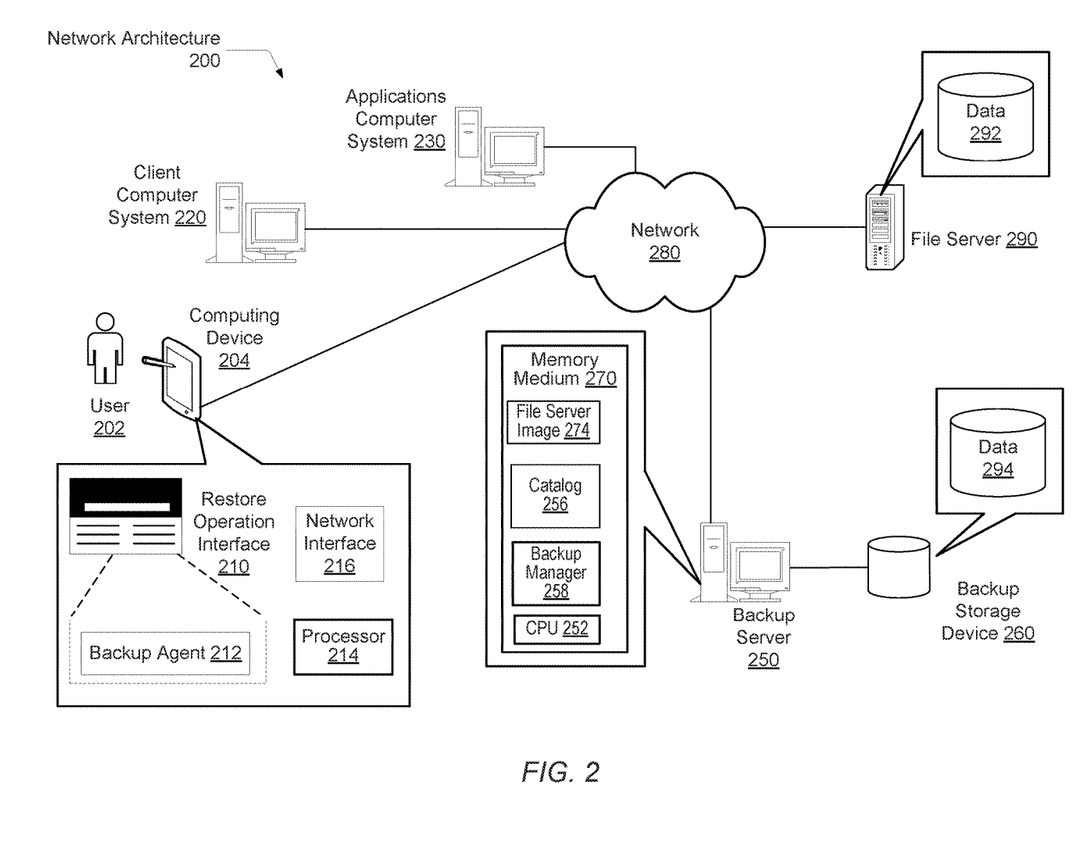
FIG. 2 is a generalized block diagram illustrating one embodiment of a network architecture.
Figure 3:
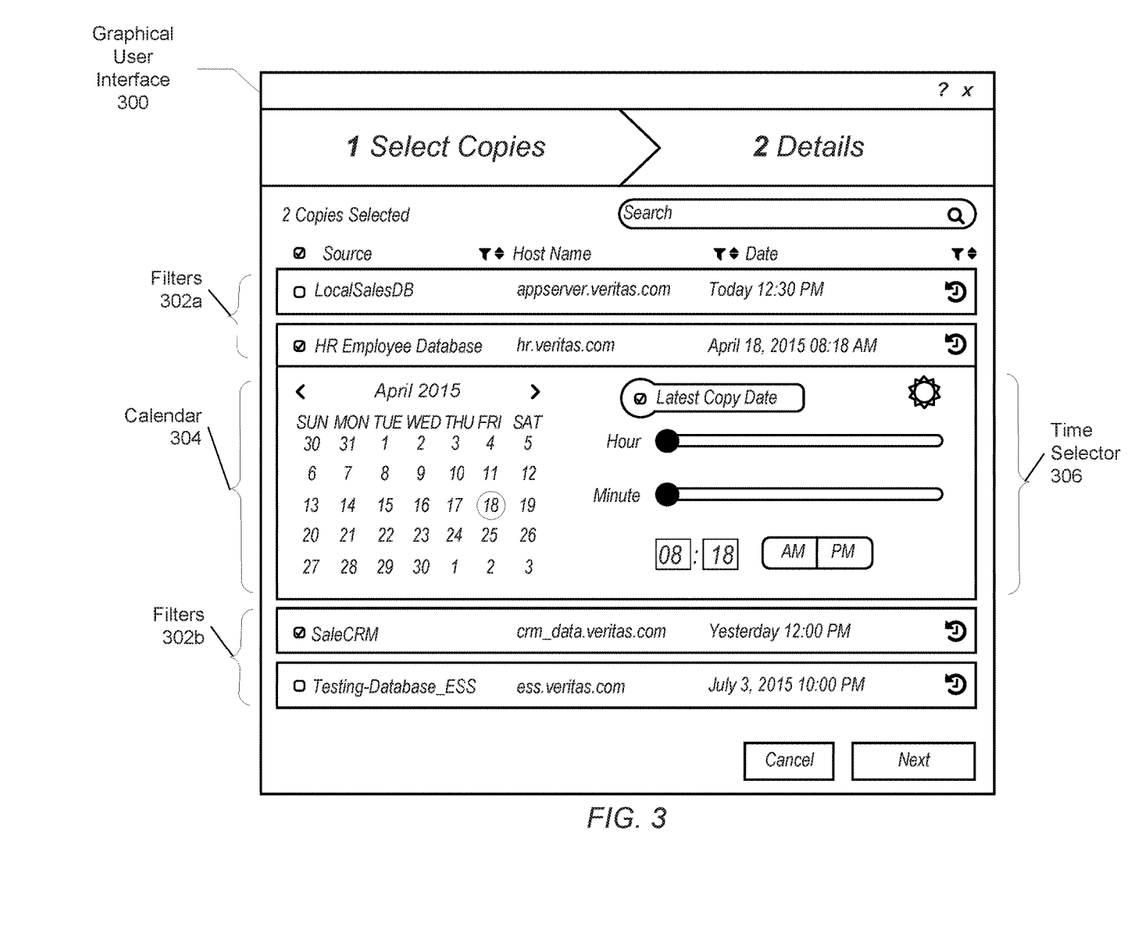
FIG. 3 is a generalized block diagram of one embodiment of a graphical user interface (GUI) for a restore browsing application.
Figure 4:
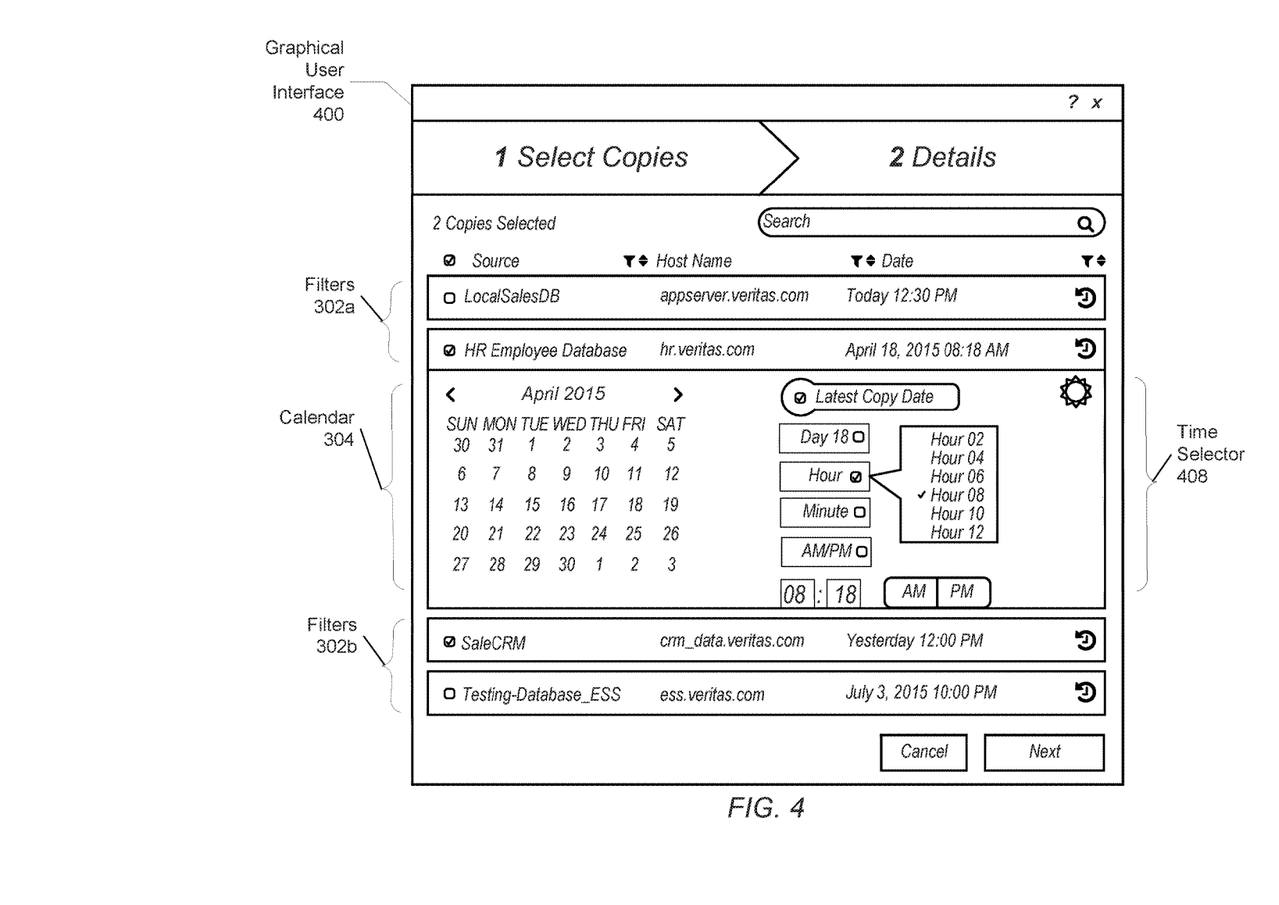
FIG. 4 is a generalized block diagram of another embodiment of a graphical user interface (GUI) for a restore browsing application.
Figure 5:
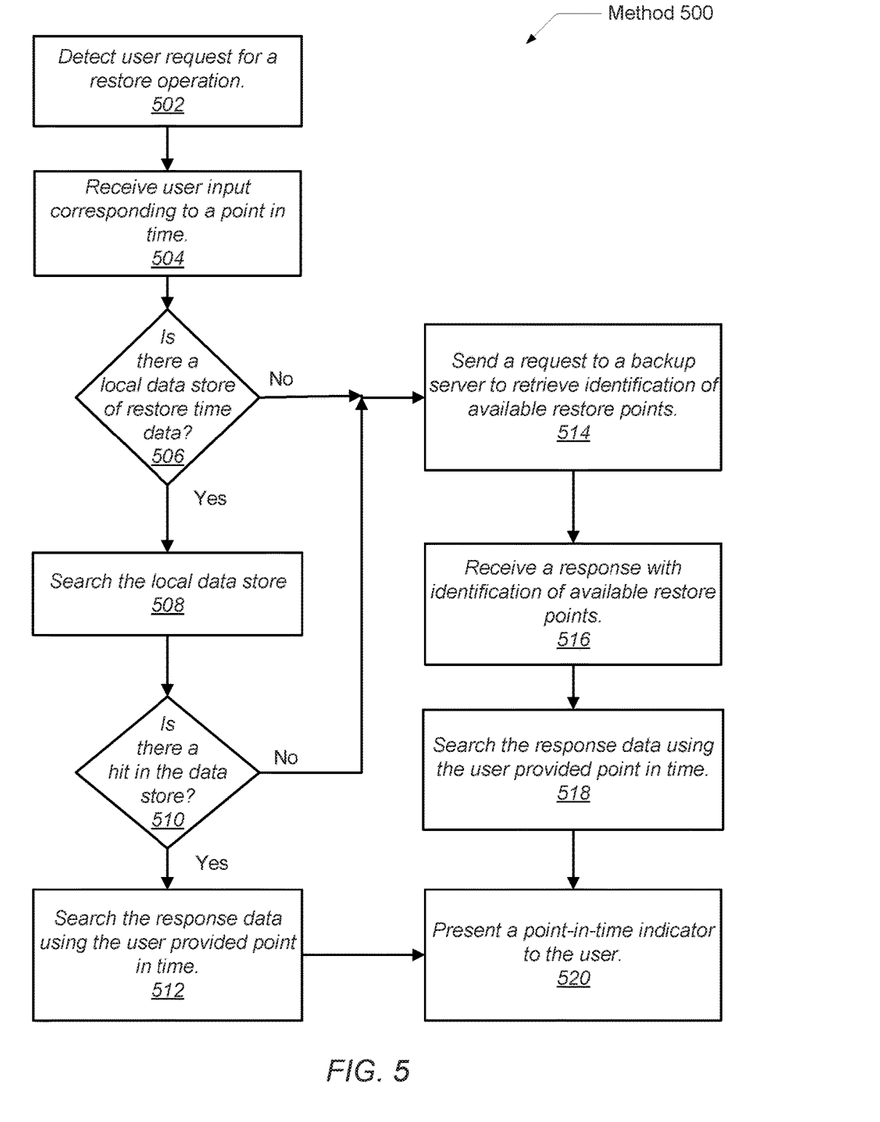
FIG. 5 is a flow diagram illustrating one embodiment of a method for selecting point-in-time backup copies of data objects for restore operations.
Figure 6:
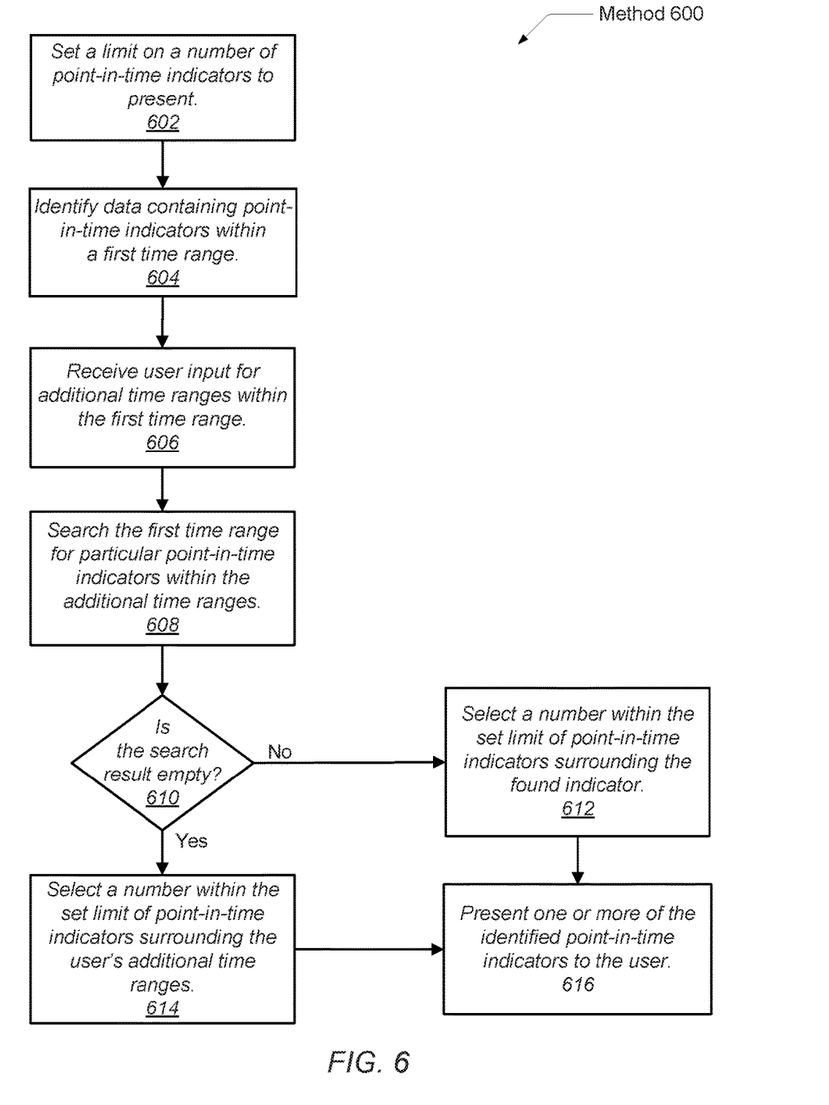
FIG. 6 is a flow diagram illustrating one embodiment of a method for searching and selecting point-in-time indicators to present to the user.

In the following discussion, FIG. 1 illustrates a generalized example of reducing a number of point-in-time indicators of data objects to present to a user. FIG. 2 illustrates a network architecture for a backup and restore environment. Following, FIG. 3 to FIG. 4 illustrate examples of a GUI for selecting data objects for a restore operation. Finally, each of FIG. 5 and FIG. 6 illustrates a method for selecting a limited number of available point-in-time indicators corresponding to backup copies of a requested data object in backup storage.

Turning now to FIG. 1, a generalized block diagram illustrating one embodiment of reducing a number of point-in-time indicators of data objects to present to a user is shown. A user 10 operates a computing device 12, which may be a mobile computing device such as a tablet computer, a smartphone, or other. An initial copy of a data object 20 is backed up by a backup operation. The backup operation may be a full backup operation. The data object 20a may include data 24, such as data for an electronic document, an application file, a script file, an email, a larger entity such as a database file, or other. The data object 20a may also include metadata such as at least a point-in-time indicator which indicates a time that the backup copy of the data object 20a is created. The point-in-time indicator may include a date, an hour of the day and a minute of the hour. Other examples of time used in the point-in-time indicator are possible and contemplated.

Multiple subsequent backup operations may be performed for the data object 20a. The subsequent backup operations may include partial backup operations, such as incremental backup operations or differential backup operations. As shown, the point-in-time backup copies 20d, 20g, 20k and 20m of the data object 20a are created. Although these four backup copies are shown, thousands, tens of thousands or millions of backup copies of the data object may be created over time. A backup copy for each hash mark on the timeline is not shown for ease of illustration. In one example, if continuous backup operations are performed each second of the day, then 86,400 backup copies of the data object are created daily. Each of the backup copies of the data object has a corresponding point-in-time indicator in its metadata. The number of backup copies can increase to millions over weeks and months and even years.

With the computing device 12, the user 10 may access a homepage of a Web-based backup and restore application. The homepage may include a graphical user interface (GUI) used for selecting the data object to restore. The GUI may also present a manageable number of point-in-time indicators to the user 10, rather than a significantly large number of point-in-time indicators associated with the backup copies of the data object. The user 10 may select a date in the GUI on the computing device 12. The date may correspond to the time duration between the markers t1 and t4 on the timeline. The selected date may indicate a year, a month of the year and a day of the month.

After the user 10 selects the date in the GUI on the computing device 12, the computing device 12 may send a request to a backup server with an indication of the data object and the selected date. The backup server is not shown for ease of illustration. The point-in-time indicators for the backup copies of the data object between the markers t1 and t4 may be placed in the set 50. The set 50 may be returned to the computing device 12 in a response from the backup server. Alternatively, the set 50 is sent to an applications server hosting the Web-based backup and restore application.

When the user 10 selects the date and the backup server receives the associated request, millions of point-in-time indicators for the data object may be found corresponding to millions of backup copies of the backup copies 20a-20m stored on the backup server or on a storage medium such as hard disks connected to the backup server. In some embodiments, the point-in-time indicators associated with the particular date are retrieved. In other embodiments, the point-in-time indicators associated with the particular date and a given time duration both before and after the particular date are retrieved. For example, point-in-time indicators corresponding to backup copies of the given data object for five weeks before the particular date and for five weeks after the particular date may be sent from the backup server to the computing device 12 in set 50. The time duration both before and after the particular date may be configurable.

The computing device 12 may use the point-in-time indicators in set 50 returned from the backup server by accessing the applications server through the Internet or other network. Alternatively, the computing device 12 may have downloaded software that performs work on the computing device 12 to avoid continually accessing the Web-based application hosted on a remote server.

The GUI on the computing device 12 may receive input from the user 10 with additional time requests, such as an hour of the day and a minute of the hour. These additional time requests may be used to reduce the number of available point-in-time indicators to present to the user 10. In the example shown, the additional time requests may define a time duration between the markers t2 and t3 on the timeline. The point-in-time indicators for the backup copies of the data object between the markers t2 and t3 may be placed in the set 40. A limit may be set on a number of point-in-time indicators to place in the set 50 and present to the user 10. The limit may be based on one or more selected levels of granularity of time such as the year, the month of the year, the day of the month, the hour of the day, the minute of the hour, and the second of the minute. The one or more limits may be configurable numbers.

When the user 10 selects the date and the backup server receives the associated request, millions of point-in-time indicators for the data object may be returned to the computing device 12 in set 30. The millions of point-in-time indicators may correspond to multiple weeks surrounding the selected year, or the selected month of the year, or the selected day of the month in the request sent to the backup server. In some embodiments, an initial limit of one point-in-time indicator may be used to retrieve one point-in-time indicator from the set 30 and place it in the set 50 (skipping set 40 for the time being) to present to the user 10.

When the initial level of granularity of time is a year, the selected one point-in-time indicator based on the limit of one may correspond to a mid-year point-in-time indicator, a first point-in-time indicator for the selected year, a last point-in-time indicator for the selected year, or other. Alternatively, the limit may be 12 with one point-in-time indicator for each month of the selected year. The computing device may select a first point-in-time indicator for a given month, a last point-in-time indicator for the given month, a mid-month point-in-time indicator for the given month or other to place in the set 50 for presenting to the user 10. The one or more point-in-time indicators in the set 50 to present to the user 10 may be presented by one of various manners. For example, a drop-down menu may be used, a popup informational box may be used, one or more numeric readouts may be used, handles of sliders may be used, and so forth.

In another example, when the user 10 operates the GUI on the computing device 12 to select a particular year, a month within the year, a day within the month and an hour within the day, the computing device 12 may find 3,600 point-in-time indicators among the millions of point-in-time indicators in the set 30 to place in the set 40. The 3,600 point-in-time indicators in the set 40 may correspond to 3,600 backup copies of the backup copies 20a-20m of the given data object stored on the backup server for the selected hour. Each point-in-time indicator may correspond to a second within the selected hour of the day. However, a limit may be set at a number of 6 point-in-time indicators to retrieve from the set 40 to place in the set 50 and present to the user 10. Each of the 6 point-in-time indicators presented to the user 10 through the GUI on the computing device 12 may correspond to a respective ten-minute increment within the hour.

In addition to the above examples, other examples of both (i) a limit of a number of point-in-time indicators to retrieve from the set 40 and/or the set 30 and place in the set 50 for presenting to the user 10 and (ii) the selection of the limited number of point-in-time indicators are possible and contemplated. Each of the limit and the selection of the limited number of point-in-time indicators may change based on the level of granularity of time, such as one or more of the selected month, the selected week, the selected day, the selected hour, the selected minute and the selected second.

Multiple differing limits may be used by the user 10 to fine-tune a selection of a point-in-time indicator. The user 10 may begin with a year and a month in mind for a restore operation of a given data object, but be unsure of which day or hour and minute of the day from which to restore. The limited number of point-in-time indicators in the set 50 presented to the user 10 may aid in selecting the point-in-time from which to restore the given data object.

Turning now to FIG. 2, a generalized block diagram illustrating one embodiment of a network architecture 200 is shown. Network architecture 200 includes applications computer system 230, client computer system 220 and computing device 204 interconnected through a network 280 to one another, to a file server 290, and to a backup server 250. Disk storage 260 is coupled to backup server 250. Network 280 may include a variety of techniques including wireless connection, direct local area network (LAN) connections, wide area network (WAN) connections such as the Internet, a router, and others. Network 280 may include one or more LANs that may also be wireless. Network 280 may further include remote direct memory access (RDMA) hardware and/or software, transmission control protocol/internet protocol (TCP/IP) hardware and/or software, router, repeaters, switches, grids, and/or others.

In various embodiments of network architecture 200, applications computer system 230 is representative of any number of servers hosting business-critical applications and database servers. In the embodiment shown, a single client computing system 220 and a single computing device 204 are connected to the network 280. However, in various other embodiments, each of multiple computing systems and computing devices is connected to the network 280, which are not shown for ease of illustration.

Client computer system 220 is representative of any number of stationary or mobile computers such as servers, desktop PCs, laptops, handheld computers, etc. Computing device 204 is representative of any number of mobile computing devices with touch screens such as at least tablet computers and smartphones. Each of the client computer system 220 and computing device 204 may include at least a single processor for executing instructions of software applications stored on a memory medium. As shown, the computing device 204 includes the processor 214.

The processor 214 may include one or more processor cores including circuitry for executing instructions according to a predefined general-purpose instruction set architecture (ISA). For example, the SPARC® instruction set architecture (ISA) may be selected. Alternatively, the x86, x86-64®, Alpha®, PowerPC®, MIPS®, PA-RISC®, or any other ISA may be selected. In other embodiments, the computing device 204 may include a system-on-a-chip (SOC) with one or more processors utilizing very wide single instruction multiple data (SIMD) architectures to achieve high throughput in highly data parallel applications. For example, the computing device 204 may include one or more of a graphics processing unit (GPU), a digital signal processor (DSP), and the like.

Each of the client computer system 220 and computing device 204 may use a Mac OS X operating system, a Microsoft Windows operating system, a Unix-like operating system, or a combination that includes a hard disk partitioned to host multiple operating systems. In addition, the computing device 204 may use a mobile device operating system. Each of the client computer system 220 and computing device 204 may include a network interface for receiving and sending packets traversing the network 280. As shown, the computing device 204 includes network interface 216.

The file server 290 in network architecture 200 may be any kind of server configured to store data. In one embodiment, file server 290 may be a Network-Attached Storage (NAS) device. The file server 290 may provide file storage services to client computer system 220, computing device 204 and other information servers (not shown). The operating system and other software on the file server 290 provide the functionality of file systems, the access to files, and the management of these functionalities. The data 292 may be stored on one or more of the hard disks of the file server 290. Files on the file server 290 may be accessed through a Network File System (NFS) interface included in network 280.

The backup storage device 260 may store backup copies of data within the network architecture 200. Backup data 294 may store copies of data 292, copies of data included in client computer system 220, computing device 204 and copies of data included in other information servers (not shown). Backup storage device 260 may include or be further coupled to several varieties of storage consisting of one or more hard disks, tape drives, server blades, specialized devices and so forth.

In one embodiment, the backup server 250 in network architecture 200 may include a backup application 258. This backup application 258, or "backup manager" may include program instructions stored on the memory medium 270 and executable by the processor 252 to perform one or more backup operations. Backup operations may include creating full backups. Backup operations may also include partial backups, such as incremental backups or differential backups. The backup application 258 may also be used to perform restore functions (e.g., partial or granular restore functions, or full restore functions) on a computer system or from one computer system to another computer system.

In various embodiments, the backup manager 258 may create a backup of a specific system automatically, e.g., the backup manager may be scheduled to perform regular backups of a specific system. The backup manager 258 may create and store the backup, or the file server image 274, in a commonly known file format, such as the Virtual Hard Disk (VHD) format, the V2I format, and the Virtual Machine Disk Format (VMDK) format.

In one embodiment, the backup manager 258 on backup server 250 may create the backup of data 292, such as file server image 274, and store it on the backup storage device 260. In another embodiment, the backup manager 258 may store the backup on the backup server 250, e.g., on a memory medium 270 of the backup server 250, as shown. In yet other embodiments, the backup manager 258 may instead store the backup on another device, e.g., on another computer system (such as another server) connected over the network 280. In any of the embodiments, a backup copy of a backup may be subsequently restored to the file server 290 (or to another computer or server system) in the event that it becomes necessary to do so.

In one embodiment, the backup manager 258 may create a backup of client computer system 230, computing device 204 and other computers (not shown) directly without using file server 290. Such a backup may be performed to protect data, which may not yet be updated on file server 290. In some embodiments, the backup manager 258 may automatically create file-by-file backups of client computer system 230, computing device 204 and other computers if they are connected to network 280. A database backup for applications computer system 230 may be performed that stores a copy of a web site on backup storage device 260. The web site information may include tables, records, lists of items, corresponding GUIDs, and so forth that are used to present a view of web pages within the site to a user.

As part of creating a backup the backup manager 258 may also create catalog metadata 256 associated with the corresponding files, or data objects. The catalog metadata 256 created by the backup manager 258 during a backup operation may include one or more of a data name, data size, a fingerprint of the data, a batch number, as well as data type, version number, ownership, permissions, modification time, a timestamp with date and time information, error code, etc. The timestamp may include point-in-time indicators, such as at least a date, hour of the day and a minute of the hour. The point-in-time indicators may be used to identify point-in-time backup copies of data objects stored on the storage device 260 when performing restore browsing. Accordingly, the point-in-time indicators may also be used to verify whether a backup copy of a given data object exists at a particular point-in-time. Other forms of metadata and/or identifiers will be apparent to those of ordinary skill in the art. The catalog metadata 256 may be usable for restore browsing, such as the user 202 using the restore operation interface 210 on the computing device 204.

The catalog metadata 256 may include backup points in time used to search and identify point-in-time backup copies of data objects stored on the storage device 260. The type and arrangement of the data structure storing the point-in-time indicators may be selected for efficient searching. In some embodiments, the point-in-time indicators may be stored in a data structure separate from data structures used for storing other metadata associated with the backup copies of the data objects. Maintaining separate data structures may provide both a smaller size and a different arrangement for the storage of the point-in-time indicators. The smaller size and different arrangement may provide more efficient searching when the initial request from the GUI 210 is received based on the user 202 selecting a given data object and a first time range, such as a date, in the GUI 210.

One of many known data structures used for efficient searching may be used for storing the point-in-time indicators. In some embodiments, a hash index may be used for identifiers of the given data object. For example, a hash value derived from one or more of a filename, a directory name and a file system name may be stored in a first structure. In addition, the received first time range, such as a date selected from the calendar in the GUI 210, may be compared to the current date. The time difference may indicate the type of backup copies that are still present. For example, continuous backups performed every second of the day may have a lifespan of a day, multiple days, a week or other. If the lifespan has expired, then the millions of backup copies at this granularity of time may no longer exist. Rather, tens of thousands or less of backup copies at a larger granularity may be searched while skipping any search at all of millions of backup copies at the smaller granularity. One or more sorted skip lists may be used for providing a more efficient search to provide available point-in-time indicators to the computing device 204.

In addition, the data structures used for searching the point-in-time indicators may also include self-balancing binary search trees that maintain a given ratio between its height and breadth. The ratios may differ among different data structures, but each node N may provide a $\log_2 N$ asymptotic running time. The self-balancing binary search tree data structures may include one or more of AVL trees, red-black trees, 2-3 trees, 2-3-4 trees, splay trees, B-trees, and others.

In some embodiments, each of the client computing system 220 and the computing device 204 may contain backup system agent software. As shown, the computing device 204 includes the backup agent 212. The backup agent 212 is a software routine that may wait for a detection of a given event and perform one or more actions when such detection occurs. The backup agent 212 may assist the backup manager 258 on the backup server 250 to perform one or more backup and restore functions. Alternatively, each of the client computing system 220 and the computing device 204 may access a Web-based backup and restore application hosted on the applications computer system 230 or hosted on the backup server 250.

The interface 210 may be a graphical user interface (GUI) provided on a display, such as a touch screen on the computing device 204. The user 202 may use the interface 210 to select a given data object to restore from the backup storage device 260 and also select a first time range. The first time range may be a date. For example, the user may select a day of a particular month and year using a calendar presented in the interface 210. In some embodiments, the user 102 uses a finger or stylus pen to select the data on the touch screen. In other embodiments, the user 102 may speak the date into a microphone. The date selection may be the given event the backup agent 212 detects to send a request to the backup server 250. The request may include an indication of the given data object to compare with metadata in the catalog 256. The request may also include an indication of the selected date, which is also compared to metadata in the catalog 256.

The backup server 250 may send a response to the computing device 204 with point-in-time indicators corresponding to the given data object and for the entire month associated with the selected date. Alternatively, the backup server 250 may send point-in-time indicators for a given time duration both prior to and after the selected date. For example, point-in-time indicators corresponding to backup copies of the given data object for five weeks before the selected date and for five weeks after the selected date may be sent from the backup server 250 to the computing device 204. The time duration both before and after the selected date may be configurable.

The user 202 may use the interface 210 on the touch screen of the computing device 204 to input additional time ranges within the selected date, which is the first time range. For example, the user 202 may input an hour of the day and a minute of the day in the interface 210. Each of the hour and the minute are examples of additional time ranges. In some embodiments, the user 202 types the selected additional time ranges on the touch screen keyboard. In other embodiments, the user 202 speaks the additional time ranges into a microphone. In yet other embodiments, the user 202 may select a drop-down menu that presents options for the additional time ranges based on the selected first time range, such as the selected date. In still yet other embodiments, the user 202 drags handles of a slider on the touch screen for selecting additional time ranges.

The user 202 may drag the handles of sliders left or right in order to increase or decrease the hour or minute values. Instead of sliding freely, the handles may snap to the nearest hour and minute values associated with a point-in-time indicator for an existing point-in-time copy of the given data object. The point-in-time indicators received from the backup server 250 may be used for the snap values. Additionally, the point-in-time indicators received from the backup server 250 may be used for options to present in drop-down menus. Other levels of granularity may be used for the first time range and the additional time ranges other than a date, hour of the day and minute of the hour.

The backup agent 212, other software or other logic on the computing device 204 may process inputs from the interface 210 and the response data received from the backup server 250. The logic may be implemented in hardware, in software, or a combination of hardware and software. Although the remainder of the description for the computing device 204 refers to the backup agent 212 for processing data, other software or other control logic may be used for the processing.

The backup agent 212, other software or other logic on the computing device 204 may search the data in the response received from the backup server 250 based on the first time range and the additional time ranges. For example, the backup agent 212 may search the response data based on the selected date, hour and minute. If the backup agent 212 determines there is no point-in-time indicator indicating the existence of a backup copy of the given data object at the selected point-in-time, then the backup agent 212 may select a next closest point-in-time indicator corresponding to an existing backup copy of the given data object. The backup agent 212 may automatically select one of the one or more backup copies as a proposed backup copy for restoration. In doing so, the backup agent 212 or other logic selects a corresponding point-in-time indicator. The backup agent 212 or other logic may also automatically adjust the point-in-time indicator received input from the user on the interface 210 to identify the automatically selected backup copy. The backup agent 212 or other logic may present the automatically adjusted point-in-time indicator on the interface 210 to the user 202. An indication such as a color change, font change, a highlighted box, a popup menu or other may be used to indicate to the user 202 that a different point-in-time is selected.

The backup agent 212 may have a limit set of the number of point-in-time indicators to present to the user 202. This number may be configurable. For example, the backup agent 212 may find 3,600 point-in-time indicators corresponding to 3,600 backup copies of the given data object stored on the backup server 250 for a given hour of the day. Each copy may correspond to a second within the selected hour of the day. However, a limit may be set at a number of 6 point-in-time indicators to present corresponding to 6 backup copies of the given data object. Therefore, the backup agent 212 may present 6 point-in-time indicators, each corresponding to a respective ten-minute increment within the hour.

Turning now to FIG. 3, a generalized block diagram of one embodiment of a graphical user interface (GUI) for a restore browsing application is shown. The GUI 300 may be presented on a touch screen of a display of a mobile computing device, such as a tablet computer, a smartphone and so forth. The GUI 300 may include features such as drop-down menus, a search bar, a calendar, slider handles, check boxes and buttons on a tool bar, and so on. In various embodiments, the GUI 300 is presented on a default webpage of a Web-based backup and restore application.

The GUI 300 may include filters 302a-302b for a user to search, select and sort information for a restore operation. When a tabular row of the filters 302a-302b is selected, the row may expand to show further details. Rows may be toggled for selection by either clicking the checkbox or clicking anywhere in the row. As shown, the rows present database file names, homepage names and timestamps such as a date, an hour of the day and a minute of the hour of a selected database file.

The GUI 300 also includes a calendar 304 for selecting a date for a restore operation. The user may change the date from the current date to another year, month and day. In some embodiments, when the user clicks the month, a drop-down menu presents available months for the selected database file. Similarly, when the user clicks the year, a drop-down menu presents available years for the selected database file. A limit of a number of months and/or years to present in the drop-down menu may be used. The limit may be configurable. As described earlier, the date selection may be the given event that causes the mobile computing device to send a request to a backup server. The request may include an indication of the given data object, such as the selected database file, and an indication of the selected date used as a point-in-time. As described earlier, the backup server may include catalog metadata. The catalog metadata may store backup points in time in a data structure arranged for efficient searching.

The time selector 306 of the GUI 300 includes a checkbox for a latest backup copy of the selected data object, such as a database file or other. As shown, the time selector 306 includes time-based sliders for selecting an hour of the day and a minute of the hour for a restore operation for the selected data object. The time selector 306 also includes a numeric readout for the hour of the day and the minute of the hour. Additionally, the time selector 306 includes buttons for selecting an AM/PM indication for the time of day.

In various embodiments, moving the handles of the time-based sliders unchecks the latest copy selection and the user is able to customize a selection for a time of day to use as a point-in-time for a restore operation. As described earlier, the handles may not sliding freely, but rather snap to the nearest hour and minute values associated with a point-in-time indicator for an existing backup copy of the selected data object. The available point-in-time indicators may have been retrieved from the backup server when the date was selected in the calendar 304.

As the handles of the time-based sliders snap to hour and minute values as the user moves them, the time of day selected by the sliders may be shown by the hour and minute numeric readouts. The user may also type number values into the readout boxes. Alternatively, drop-down menus may be used to adjust the values in the numeric readout boxes. When the user selects a point-in-time that does not have a corresponding backup copy of the selected data object, control logic may identify one or more backup files that do include the given data object, automatically select one of the one or more backup files as a proposed backup file for restoration, and automatically adjust the received input from the user in the time selector 306 to identify the selected one of the one or more backup files. For example, the point-in-time values in the readouts may jump or snap to a closest hour and minute of a point-in-time indicator that corresponds to the automatically selected one of the one or more backup files as a proposed backup file for restoration.

The one or more above backup files that do include the given data object may include backup files within a given period of time of the user-selected point-in-time. This given period of time may be programmable. In addition, the user may provide an indication of a level of granularity for presentation of backup files that are available for restoration. For example, the user may be able to select a level of granularity of time for presenting points in time corresponding to the backup files that are available for restoration.

To alert the user that a different point-in-time is selected and displayed, the time selector 306 may present an indication that the point-in-time requested by the user is not available and an alternative point-in-time has been selected. For example, the indication may be one or more of the color of the numerals, the color of the border of the readouts and the font of the numerals may change. In addition, the indication may be a popup window may appear.

Although drop-down menus are not shown in the time selector 306, they may also be used in other embodiments. For example, when a date is selected in the calendar 304, a drop-down menu may be used for selecting an hour of the day. Rather than show each available hour, the drop-down menu may use a set limit for the number of available hours to present. The limit may be a configurable value. Similarly, when an hour is selected, a drop-down menu may be used for selecting the minute of the hour. Rather than show each available minute, the drop-down menu may use a set limit for the number of available minutes to present. This limit may also be a configurable value. The Next button shown at the bottom right corner may be selected to proceed to another webpage for controlling the restore operation for the selected data object and the selected point-in-time(s).

When continuous backup operations and deduplication operations are used, a number of available backup copies for a given data object on a given day may reach 86,400. Rather than provide such a large number to the user of available point-in-time indicators corresponding to the 86,400 available backup copies of the given data object, the GUI 300 presents a manageable number of available point-in-time indicators using the snap values or using a limit within drop-down menus. For example, when a date is selected from the calendar 304, an available point-in-time indicator closest to midday may be automatically selected and presented to the user through the sliders or the numeric readout boxes. Alternatively, when a drop-down menu (not shown) is selected, a number of available point-in-time indicators less than a limit may be presented for the date selected in the calendar 304. Although database files are shown in the GUI 300, other granularities of data, such as particular files and documents within a database file may be selected within the GUI 300 for a restore operation.

Referring now to FIG. 4, a generalized block diagram of another embodiment of a graphical user interface (GUI) for a restore browsing application is shown. The GUI 400 may be presented on a touch screen of a display of a mobile computing device, such as a tablet computer, a smartphone and so forth. Similar to the GUI 300, the GUI 400 may include features such as drop-down menus, a search bar, a calendar, check boxes and buttons on a tool bar, and so on. Features that are the same as in the GUI 300 are numbered identically. In various embodiments, the GUI 400 is presented on a default webpage of a Web-based backup and restore application.

As shown, the GUI 400 includes the time selector 406 with drop-down menus. The drop-down menus may be used to select a day of the month, an hour of the day, a minute of the hour, and an AM/PM setting for morning or evening time of day for a restore operation for the selected data object. The number of options presented in each drop-down menu may be set by a configurable and respective limit. The available values presented in the drop-down menus may be based on the limit values, previous selections and available point-in-time indicators retrieved earlier. The available point-in-time indicators may have been retrieved from the backup server when the year or month was selected in the calendar 304.

As the options in the drop-down menus are selected, the time of day selected may be shown by the hour and minute numeric readouts. The user may also type number values into the readout boxes if the desired option is not shown in the drop-down menus. For example, if the user is sure about a restore operation being performed for a backup copy of the selected data object at 01:30 PM, then the user may type in the hour 01 in the numeric readout box as the option of the hour 01 is not present in the drop-down menu.

As described earlier, when the user types a point-in-time in the numeric readout boxes that does not have a corresponding backup copy of the selected data object, the values in the readouts may jump to a closest hour and minute of a point-in-time indicator that does correspond to a backup copy of the selected data object. To alert the user that a different point-in-time is selected and displayed, one or more of the color of the numerals, the color of the border of the readouts and the font of the numerals may change. In addition, a popup window may appear. Points-in-time that do not correspond to an available backup copy of the selected data object are not presented in the drop-down menus.

Turning now to FIG. 5, one embodiment of a method 500 for selecting point-in-time backup copies of data objects for restore operations is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 502, a user request for a restore operation is detected on a computing device. In various embodiments, the computing device is a mobile computing device such as a tablet computer, a smartphone, another handheld device or other. The request may include an identifier indicating a given data object that the user desires to restore. The user may be using a graphical user interface (GUI) for a backup and restore application. The application may be accessed locally or accessed across a network to a remote server. In block 504, an indication of a point-in-time for the restore operation is received from the user.

The received point-in-time may include a first time range, such as a calendar year, along with additional time ranges such as a month of the year, a day of the month, an hour of the day and so forth. In some embodiments, a backup server may automatically send point-in-time indicators to a computing device based on the current date. The point-in-time indicators may correspond to backup copies of a given data object. The point-in-time indicators may be stored with other metadata in a catalog on the backup server. The backup server may perform the automatic sending of the point-in-time indicators on a scheduled basis, such as once a week, once a month or other. The periodic rate for automatically sending the point-in-time indicators may be configurable. The computing device may store the received point-in-time indicators in a local data store or a local database.

If the computing device has a local data store (conditional block 506), then in block 508, the computing device performs a lookup of the local data store using one or more of the first time range and the additional time ranges within the received point-in-time. If there is a hit in the local data store (conditional block 510), then in block 512, the computing device searches the data store for a limited number of point-in-time indicators. The number of the point-in-time indicators may be set by a configurable limit. In some embodiments, the computing device may search the data store for a limited number of point-in-time indicators for each range of the first range and the additional ranges within the received point-in-time. For example, the user may input a point-in-time that includes a calendar year, a month of the year, a day of the month, an hour of the day and a minute of the hour. The computing device may search the data store for a limit of 12 point-in-time indicators for the calendar year, one for each month of the year. The computing device may search the data store for a limit of 30 or 31 point-in-time indicators for the month, one for each midday point-in-time indicator for each day of the month. The computing device may search the data store for a limit of 1 point-in-time indicator for the minute of an hour within a selected day within a selected month and year. Other limits for other time ranges are possible and contemplated.

In block 520, one or more point-in-time indicators are presented to the user via the GUI. Further details about the search and selection of point-in-time indicators to present are provided in the description of the next method.

If the computing device does not have a local data store (conditional block 506) or there is a miss in the local data store during an access (conditional block 510), then in block 514, the computing device sends a request to a backup server to retrieve identification of available restore points. The request to the backup server may be a request to retrieve point-in-time indicators within one or more of the first time range and the additional time ranges. As described earlier, the first time range may be a calendar year or a month within a year. Other examples of a first time range may also be used.

In block 516, the computing device receives a response with identification of available restore points. The response may include point-in-time indicators within the first time range. In block 518, the computing device searches the response data for point-in-time indicators using the user provided point-in-time. Following, control flow of method 500 moves to block 520, which is described earlier.

Referring now to FIG. 6, one embodiment of a method 600 for searching and selecting point-in-time indicators to present to the user is shown. For purposes of discussion, the steps in this embodiment are shown in sequential order.

However, some steps may occur in a different order than shown, some steps may be performed concurrently, some steps may be combined with other steps, and some steps may be absent in another embodiment.

A computing device, such as a mobile computing device has received response data from a backup server. The response data includes multiple point-in-tine indicators corresponding to backup copies of a given data object. In block 602, a limit of a number of point-in-time indicators to present to the user is set. Multiple limits corresponding to different levels of granularity for time ranges may be set. For example, a respective limit may be set for a year, a month of the year, a day of the month and so forth. In block 604, the computing device identifies the data containing point-in-time indicators within a first time range, such as a year, a month of the year, a day of the month, and so forth. The data may be stored in a given location in memory of the computing device.

In block 606, the computing device receives user input for additional time ranges within the first time range. For example, an hour of the day may be selected for the first time range corresponding to a day of a particular month in a particular year. In block 608, the computing device searches data corresponding to the first time range for particular point-in-time indicators within the additional time ranges.

If the search provides hits for the additional time ranges (conditional block 610), then in block 612, the computing device selects a number within the set limit of point-in-time indicators surrounding the found indicator(s). However, if the search provides an empty result for the additional time ranges (conditional block 610), then in block 614, the computing device selects a number within the set limit of point-in-time indicators surrounding the user's additional time ranges, rather than a found result. In block 616, the computing device presents one or more of the identified point-in-time indicators to the user. For example, the computing device may use handles of a slider, numeric readout boxes, drop-down menus, popup menus and so forth to present the limited number of point-in-time indicators to the user. Following, the user may select one of the presented point-in-time indicators and continue setting up a restore operation for a given data object.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for selecting point-in-time copies of data objects for a restore operation, the method comprising:
   a user providing input via a graphical user interface, wherein the input is configured to request restore of a backup of a given data object, the request identifying a point-in-time of the backup;
   in response to determining a backup of the given data object does not exist for the point-in-time:
      identifying one or more backups that do include the given data object;
      automatically selecting one of the one or more backups as a proposed backup for restoration; and
      automatically adjusting the input of the user on the graphical user interface to identify the selected one of the one or more backups by adjusting a slider to a particular point-in-time other than the point-in-time originally provided by the user.

2. The method as recited in claim 1, wherein the input by the user is provided via a time based slider on the graphical user interface, and wherein automatically adjusting the slider to the particular point-in-time comprises snapping the slider to the particular point-in-time.

3. The method as recited in claim 1, further comprising presenting an indication that the point-in-time requested by the user is not available and an alternative point-in-time has been selected.

4. The method as recited in claim 1, wherein the one or more backups that do include the given data object include backups within a given period of time of the point-in-time.

5. The method as recited in claim 3, wherein said given period of time is programmable.

6. The method as recited in claim 1, wherein the user provides said input on a handheld device, and wherein the method further comprises a server automatically pushing data to the handheld device that identifies available backups.

7. The method as recited in claim 6, further comprising storing said data in the handheld device.

8. The method as recited in claim 1, further comprising the user providing an indication of a level of granularity for presentation of backups that are available for restoration.

9. A computing system comprising:
   a backup server coupled to a data storage storing a backup copy for each of a plurality of data objects;
   a mobile device coupled to the backup server through a network;
   wherein the mobile device is configured to:
      receive input from a user via a graphical user interface, wherein the input is configured to request restore of a backup of a given data object of the plurality of data objects, the request identifying a point-in-time of the backup;
      in response to determining a backup of the given data object does not exist for the point-in-time:
         identify one or more backups that do include the given data object;
         automatically select one of the one or more backups as a proposed backup for restoration; and
         automatically adjust the input of the user on the graphical user interface to identify the selected one of the one or more backups by adjusting a slider to a particular point-in-time other than the point-in-time originally provided by the user.

10. The computing system as recited in claim 9, wherein the input by the user is provided via a time based slider on the graphical user interface, and wherein automatically adjusting the slider to the particular point-in-time comprises snapping the slider to the particular point-in-time.

11. The computing system as recited in claim 9, wherein the mobile device is further configured to present an indication that the point-in-time requested by the user is not available and an alternative point-in-time has been selected.

12. The computing system as recited in claim 9, wherein the one or more backups that do include the given data object include backups within a given period of time of the point-in-time.

13. The computing system as recited in claim 11, wherein said given period of time is programmable.

14. The computing system as recited in claim 9, wherein the user provides said input on a handheld device, and wherein the backup server is further configured to automatically push data to the handheld device that identifies available backups.

15. The computing system as recited in claim 14, further comprising storing said data in the handheld device.

16. The computing system as recited in claim 9, wherein the mobile device is further configured to receive from the user an indication of a level of granularity for presentation of backups that are available for restoration.

17. A non-transitory computer readable storage medium storing program instructions, wherein the program instructions are executable by a processor to:
    store a backup copy of a database storing a plurality of data objects;
    receive input from a user via a graphical user interface, wherein the input is configured to request restore of a backup of a given data object of the plurality of data objects, the request identifying a point-in-time of the backup;
    in response to determining a backup of the given data object does not exist for the point-in-time:
        identify one or more backups that do include the given data object;
        automatically select one of the one or more backups as a proposed backup for restoration; and
        automatically adjust the input of the user on the graphical user interface to identify the selected one of the one or more backups by adjusting a slider to a particular point-in-time other than the point-in-time originally provided by the user.

18. The non-transitory computer readable storage medium as recited in claim 17, wherein the input by the user is provided via a time based slider on the graphical user interface, and wherein adjusting a slider to the particular point-in-time comprises snapping the slider to the particular point-in-time.

19. The non-transitory computer readable storage medium as recited in claim 17, wherein the program instructions are executable by a processor to present an indication that the point-in-time requested by the user is not available and an alternative point-in-time has been selected.

20. The non-transitory computer readable storage medium as recited in claim 17, wherein the one or more backups that do include the given data object include backups within a given period of time of the point-in-time.

* * * * *

UNITED STATES PATENT AND TRADEMARK OFFICE
CERTIFICATE OF CORRECTION

PATENT NO. : 10,261,867 B1
APPLICATION NO. : 15/005774
DATED : April 16, 2019
INVENTOR(S) : Terry et al.

Page 1 of 1

It is certified that error appears in the above-identified patent and that said Letters Patent is hereby corrected as shown below:

In the Claims

Column 18, Claim 18, Line 18, please delete "a slider" and substitute -- the slider --.

Signed and Sealed this
Ninth Day of July, 2019

Andrei Iancu
*Director of the United States Patent and Trademark Office*